Feb. 29, 1944. W. L. HANSEN ET AL 2,342,936

BRUSH CONSTRUCTION FOR ELECTRICAL ROTATING MACHINERY

Filed Nov. 16, 1942

INVENTOR
WILLIAM L. HANSEN
IRA N. HURST
BY
Toulmin & Toulmin
ATTORNEY

Patented Feb. 29, 1944

2,342,936

UNITED STATES PATENT OFFICE 2,342,936

BRUSH CONSTRUCTION FOR ELECTRICAL ROTATING MACHINERY

William L. Hansen and Ira N. Hurst, Princeton, Ind., assignors to The Hansen Mfg. Co., Princeton, Ind., a corporation of Indiana Application November 16, 1942, Serial No. 465,678

8 Claims. (Cl. 171—323)

The present invention relates to electrical rotating machinery, and more particularly to an improved brush construction which is adapted to be operated in connection with high speed motors or generators and under severe changes of temperature or climatic conditions.

When rotary electrical devices of the commutator or slip ring type are operated at high speeds many problems present themselves such as friction between the brushes and commutator or slip ring, excessive sparking due to unevenness of wear and the increased danger of shorting the rotor windings due to the fast rate at which the cover bars or ring move past the brushes.

Another problem encountered by electrical rotating devices, particularly in the case of fractional horse power motors operated at low voltage and employed for actuating control or controlled mechanism in airplanes, is the matter of dependability of starting. Often the safety and effectiveness of a war plane will depend on the reliability with which the various control and controlled elements respond to the manipulations of the pilot or navigator. An electrical motor, regardless of size must always start and perform its special function. Small motors are peculiarly susceptible to starting difficulties because any unusual amount of friction or any cause for sparking at the commutator reduces the starting torque.

All of these problems are enhanced many times when the motor or generator is employed in connection with high altitude airplanes. The increased difficulties are brought about by the wide and sudden variations of temperature and climatic conditions which produce physical changes on materials and on the arrangement of the parts constituting the device. In the case of direct current motors using graphite or other lubricated brushes, the lubrication tends to harden or congeal under severely cold temperatures and friction is introduced which in turn causes excessive wear on the commutator and brushes.

The primary object of the present invention is to provide a motor or generator of the commutator or slip ring type which is not only imminently adapted for use at high altitudes and consequently low temperatures but may also be operated at high speeds and still give a reasonably long life.

A more specific object is to provide a small direct current motor which will positively and instantly start when the voltage is applied thereto under any temperature or weather conditions.

These objects are attained in brief by providing a laminated brush construction which is so counterweighted and so constructed as will not only insure contact at all times between the brush assembly and the commutator without imposing undue friction but will also minimize wear at the point of contact.

The invention will be better understood when reference is made to the following description and the accompanying drawing in which.

Figure 1:
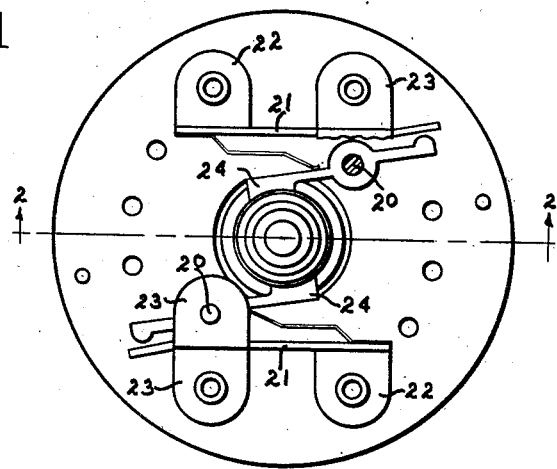
Figure 1 is an end view of a typical fractional horse power motor which is provided with the improved brush construction.
Figure 2:
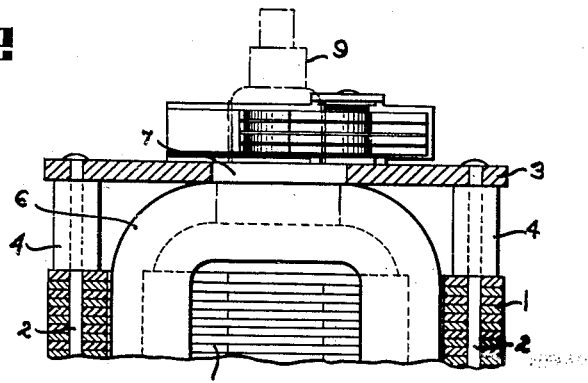
Figure 2 is a sectional view of the brush end of the field structure showing one of the brush holders and a brush in position.

Referring more particularly to Figures 1 and 2, reference numeral 1 designates a laminated field structure of any suitable and well known type. The laminations are held in place by means of pins 2 which are spaced from a disc 3 constituted of heavy cambric, hard rubber or other insulating material. Spacer collars 4 may be inserted between the discs and the uppermost layer of laminations. The field frame 1 is provided with a pair of oppositely disposed field magnets indicated at 5 which projects inwardly from the field frame and terminates in a segmental surface of circular configuration.

There is a pair of wound coils 6 surrounding the respective magnets or field poles and for rigidity purposes the uppermost surface of the coils 6 may bear against the disc 3 as shown. It will be understood that the lower end of the field magnet structure (not shown) may have the usual form of construction for motors of this general character. The disc 3 and the corresponding structure at the lower end of the field frame are provided with openings 7 which serve as a bearing for an armature generally indicated at 8 and shown in enlarged form in Figure 3. The outline of the armature is also indicated by the dot dash lines 9 in Figure 2. The upper or the lower end of the armature may terminate in a shaft 10 which is mechanically coupled to a load and the latter may comprise a controlled or controlling device for affecting the operation of an airplane or its instruments.

The shaft 10 is provided with a collar 11 on which may be mounted a plurality of commutator segments 12, 6 as shown and insulated from one another by thin strips of mica 14. The armature 8 may be constituted of an iron core having a plurality of poles indicated at 15 with armature windings positioned between the poles and the ends of the windings are brought to the commutator bars 12 in the usual manner. Current is supplied or withdrawn from the commutator bars by an improved brush assembly 16 which will be described presently. There is a pair of these assemblies of which only one has been illustrated in Figure 3. When current of suitable voltage is supplied to the brushes 16 and the field windings are properly connected to the supply circuit depending on whether the motor is shunt or serially wound, the armature will rotate due to the attracting and repelling effects exercised between the armature poles 15 and the field poles 5.

A motor of this general character is designed to operate at relatively high speeds and when made in small or fractional horsepower sizes considerable difficulty is normally present in getting a motor of this type to start. This problem is enhanced when the temperature conditions surrounding the motor are subject to severe changes as for example when the motor is employed for any purpose on a high altitude airplane or a dive bomber. The brushes of an ordinary motor are usually formed of graphite in order to provide lubrication and thus to cut down wear and friction. But such brushes do not lend themselves to abrupt or severe changes in temperature since their lubricating qualities are materially reduced under low temperature conditions. Moreover, graphite is a relatively soft material and the continual rubbing of a fast moving segmental surface against this material as in the case of high speed motors is bound to cause undue wear at the brushes.

It is the usual practice when employing graphits to provide a single brush at each brush position and unless the contacting surface of the brush conforms accurately to the contour of the commutator surface, sparking will inevitably result and difficulty will be encountered in starting the motor due to the increased IR drop at the contact positions. All of these problems have been successfully solved by the use of an improved brush and brush holder which will now be described.

Figure 3:
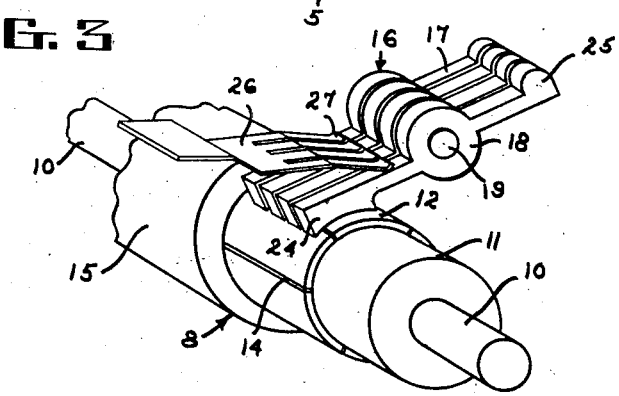
Figure 3 is a perspective view of the improved armature and brush assembly but showing only the commutator end of the armature.

As shown more particularly in Figure 3, the brush is of the laminated type and comprises a number of separately operable brush portions which are positioned side by side and which are so arranged on the brush holder that each brush portion is adapted to contact the commutator 12 independently of another of the brush portions. Each brush element 17 is provided with a centrally positioned washer-like hub 18 having an opening 19 and the openings of the respective elements are in line to be received by a pin 20 which may be secured to the disc 3 in any suitable manner. Actually, this securing means may take the form of an upright strip of metal 21 provided at one end with a horizontally disposed ear 22 and at the other end a pair of ears 23 both of which are also horizontally disposed but one extends from the lower edge of the strip 21 and the other extends from the upper edge of the strip.

The two lower edges 22, 23 of each metal strip may be riveted or in any other suitable manner secured to the disc 3. The upper or inwardly extending ear portion 23 is provided with an opening for receiving the upper end of the pin 20, thus holding the latter in a rigid vertical position. It will be understood that there are two sets of brush holders although as many as are necessary may be provided depending on the number of separate circuits formed within the armature windings.

The inner ends of the brush elements 17 are provided with a downwardly extending rectangular projection 24 the lowermost surfaces of which are given a circular shape in order to conform with that of the commutator. The opposite or outer ends of the brush elements are provided with upwardly extending enlargements 25 each of which contains sufficient material to counterbalance the weight of the projections 24. The weight and moment arms of the portions 24, 25 of each brush element may be so accurately determined that the element normally bears, due to its pivotal connection 19 with little or no friction on the commutator. In order to assure a certain but predetermined amount of pressure exerted by each brush element on the commutator, we may provide a spring 26 formed of a strip of resilient metal bifurcated at the position where it contacts the brush elements into as many subdivisions as there are elements. The contacting end of these bifurcations may terminate in portions 27 which are given a slight curve upwardly and the opposite end of the strip 26 may be rigidly secured in any suitable manner to the strips 21 as can be readily seen in Figure 1.

It is apparent that the multi-fingered strip 26 serves to impart a slight downward force on each respective brush element at a position between the pivot 19 and the downwardly extending projections 24. Consequently, should any one or more of the brush elements 17 fail to contact the adjacent surface of the commutator due to any cause whatsoever, the remaining brush elements are bound to make contact so that all sparking between the brushes and the commutator is eliminated. Positive starting under any and all conditions, including extreme cold weather and abrupt changes in temperature or humidity is assured. This factor is extremely important in connection with the use of small motors on airplanes which are subjected to a wide range in temperature both due to changes in flying altitude or changes in the seasons.

In accordance with another feature of our invention, we have completely discarded the use of so-called lubricated brushes many of which employ graphite and which are obviously greatly susceptible to changes in outdoor temperature and particularly during the intense cold weather that may be encountered during high altitude flying. Our invention contemplates the use of an all-metal brush element 17 and in order to reduce undue wear either at the brush or commutator, we propose to employ for all of these parts an alloy of beryllium and copper in which the beryllium content serves to toughen the copper. Only a few per cent of beryllium is necessary for this purpose so that the conductivity of the copper is not materially affected. It is therefore apparent that our invention departs from the usual technique of motor design construction as particularly applied to fractional horse power motors operating at high speeds in providing an all-metal brush formed of laminated portions which are so constructed as to control the exact pressure with which the brush contacts the commutator, the arrangement being such that each portion of the brush is adapted to make its own contact with the commutator, thus assuring contact at all times with at least a portion of the brush structure.

The brush and commutator structures described have been subjected to critical tests in connection with planes under operating conditions and it has been found that all of the difficulties usually encountered in this type of motor were eliminated by the improved brush, spring and commutator constructions hereinbefore described. As a matter of fact, during these tests the improved motor operated successfully under temperature conditions which were varied between 150° C. and —100° C. and it was found that the motor always started under load and maintained its predetermined constant speed. The fact that the brushes and commutator were made of a tough metal in which little or no wear was apparent over a relatively long operating life contributed to the satisfactory performance of the motor.

While we have described our invention more particularly in connection with a direct current motor it will be understood that it is not limited thereto but the same principles could be applied to the use of the improved brush in connection with the slip rings of an alternating current motor or generator.

It will be understood that we desire to comprehend within our invention such modifications as come within the scope of the claims and the invention.

Having thus fully described our invention, what we claim as new and desire to secure by Letters Patent is:

1. An electrical rotating device including a rotor provided with at least one current carrying conductor of circular shape and adapted to rotate within a magnetic field, a brush structure bearing against said conductor for supplying thereto or receiving current, said structure comprising a plurality of spring-pressed metal elements forming a composite brush, said elements being pivoted at positions intermediate of their length and provided with counterweights for balancing the portion of the composite brush between the pivots and the end which bears against said conductor.

2. An electrical rotating device including a rotor provided with at least one current carrying conductor of circular shape and adapted to rotate within a magnetic field, a brush structure bearing against said conductor for supplying thereto or receiving current, said structure comprising a plurality of spring-pressed elements forming a composite brush, said elements being formed of a tough alloy of copper.

3. An electrical rotating device including a rotor provided with at least one current carrying conductor of circular shape and adapted to rotate within a magnetic field, a brush structure bearing against said conductor for supplying thereto or receiving current, said structure comprising a plurality of spring-pressed elements forming a composite brush, said elements being formed of an alloy of copper and beryllium.

4. An electrical motor including an armature provided with a commutator and adapted to rotate within a magnetic field, a plurality of brushes bearing against said commutator at two or more sides thereof and a spring member for pressing said brushes against the commutator, said member comprising fingers formed of a slotted plate and adapted to press individually against the respective metal elements.

5. An electrical motor including an armature provided with a commutator and adapted to rotate within a magnetic field, a brush structure bearing against said commutator for supplying current to said armature, said structure comprising a plurality of spring-pressed elements forming a composite brush, said commutator and said elements being constituted of a tough copper alloy.

6. An electrical motor including an armature provided with a commutator and adapted to rotate within a magnetic field, a brush structure bearing against said commutator for supplying current to said armature, said structure comprising a plurality of counterweighted elements forming a composite brush, said commutator and each of said elements being constituted of a copper-beryllium alloy.

7. An electrical motor including an armature provided with a commutator, a magnetic field frame for supporting said armature and for introducing therein the necessary magnetic flux, a brush structure bearing against said commutator for supplying current to said armature, said structure including a plurality of brush holders, supports for said holders secured to said frame, said supports carrying upstanding pivot rods, said brush structure comprising a plurality of metal elements which are pivoted on said pivot rods, said elements being provided at their commutator ends with downwardly extending projections which bear against the commutator and at their opposite ends with projections which serve as counterweights for balancing each element about its pivot.

8. An electrical motor including an armature provided with a commutator, a magnetic field frame for supporting said armature and for introducing therein the necessary magnetic flux, a brush structure bearing against said commutator for supplying current to said armature, said structure including a plurality of brush holders, supports for said holders secured to said frame, said supports carrying upstanding pivot rods, said brush structure comprising a plurality of metal elements which are pivoted on said pivot rods, said elements being provided at their commutator ends with downwardly extending projections which bear against the commutator and at their opposite ends with projections which serve as counterweights for balancing each element about its pivot.

WILLIAM L. HANSEN.
IRA N. HURST.